(12) United States Patent
Ronk et al.

(10) Patent No.: US 7,776,404 B2
(45) Date of Patent: Aug. 17, 2010

(54) METHODS FOR FORMING THERMAL OXIDATIVE BARRIER COATINGS ON ORGANIC MATRIX COMPOSITE SUBSTRATES

(75) Inventors: Warren Rosal Ronk, West Chester, OH (US); Stephen Mark Whiteker, Covington, KY (US); Todd Aaron Bullions, Cincinnati, OH (US); Terry James Kent, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 930 days.

(21) Appl. No.: 11/606,725

(22) Filed: Nov. 30, 2006

(65) Prior Publication Data

US 2008/0213486 A1 Sep. 4, 2008

(51) Int. Cl.
*B05D 1/38* (2006.01)
*B32B 27/08* (2006.01)

(52) U.S. Cl. .................. 427/407.1; 427/387; 427/397.7

(58) Field of Classification Search .............. 427/372.2, 427/384, 385.5, 387, 388.1, 397.7, 402–419.8; 428/447, 450, 451
See application file for complete search history.

(56) References Cited

U.S. PATENT DOCUMENTS

| | | | |
|---|---|---|---|
| 6,213,720 B1 * | 4/2001 | Farmer | 416/229 A |
| 6,223,524 B1 * | 5/2001 | Durcan | 60/226.1 |
| 6,271,273 B1 | 8/2001 | You et al. | |
| 7,090,894 B2 * | 8/2006 | Carper et al. | 427/383.5 |
| 2003/0129338 A1 * | 7/2003 | Cairo | 428/36.1 |
| 2008/0056905 A1 * | 3/2008 | Golecki | 416/241 R |
| 2009/0120101 A1 * | 5/2009 | Lomasney et al. | 60/796 |

FOREIGN PATENT DOCUMENTS

WO   WO 01/46324 A2 * 6/2001

OTHER PUBLICATIONS

"Polymer, inorganic" from Hawley's Condensed Chemical Dictionary, 14th Ed., Copyright 2002 by John Wiley & Sons, Inc., retrieved from http://www.knovel.com on Jan. 21, 2010.*
Vosevic et al., "Optimal Substrate Preheating Model for Therm. Spray Dep. of Thermosets Onto Polymer Matrix Comp.," NASA Tech Memo 2003-212120 (Mar. 2003), http://ntrs.nasa.gov.
Erosion Coatings for High-Temp. Polymer Composites: A Collaborative Project With Allison Advanced Development Company, http://www.grc.nasa.gov/WWW/RT1999/5000/5150sutter.html.
Properties of PMR Polyimides Improved by Preparation of a Polyhedral Oligomeric Silsequioxane (POSS) Nanocomposites, http://www.grc.nasa.gov/WWW/RT/2004/RM/RM05P-campbell.html.

* cited by examiner

*Primary Examiner*—William Phillip Fletcher, III
(74) *Attorney, Agent, or Firm*—Marcella R. Louke; William Scott Andes; General Electric Co.

(57) ABSTRACT

Methods for forming thermal oxidative barrier coatings for organic matrix composites include applying a bond coat having nano-particles dispersed in a polyimide matrix to a hot side surface of a component and overlying the bond coat with a thermal barrier layer comprising a silsesquioxane or an inorganic polymer. The nano-particles may include clay platelets, graphite flakes or a polyhedral oligomeric silsesquioxane. The bond coat may be applied as a liquid. The thermal barrier layer may be applied as a liquid, film, prepreg, molding compound, or a spray.

12 Claims, 1 Drawing Sheet

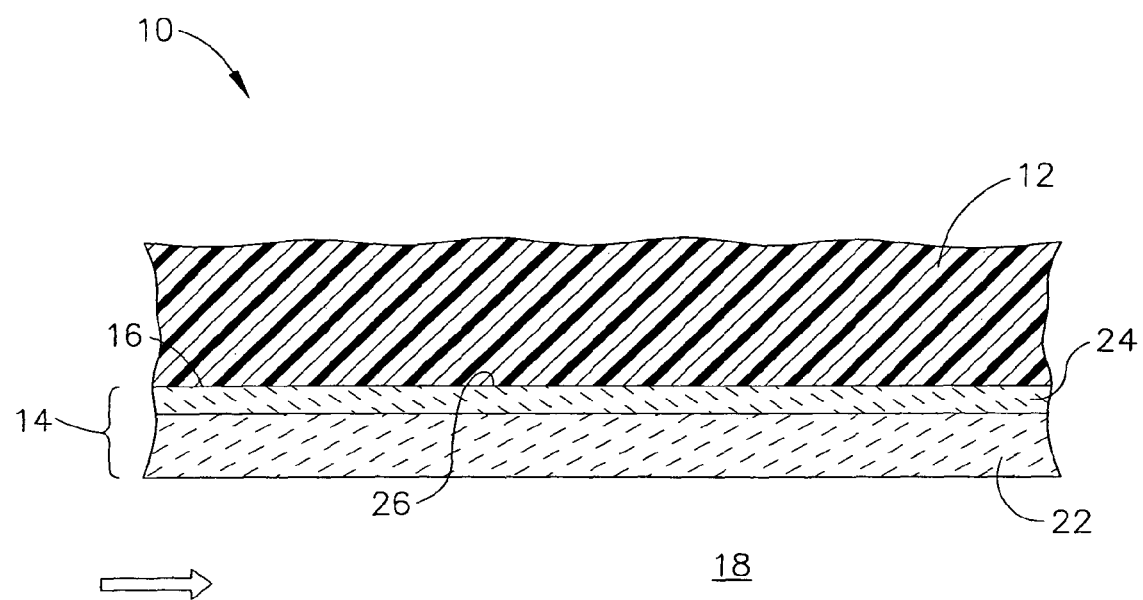

METHODS FOR FORMING THERMAL OXIDATIVE BARRIER COATINGS ON ORGANIC MATRIX COMPOSITE SUBSTRATES

BACKGROUND OF THE INVENTION

This invention relates generally to methods for forming thermal oxidative barrier coating systems for organic matrix composites.

Organic matrix composites (OMCs) are used in the aerospace industry for the weight reductions they offer when used to replace metal components. However, exposure to high temperature environments reduces mechanical properties and causes oxidative degradation of OMCs. Thus, even currently known high temperature OMCs, such as PMR-15 and AFR-PE-4, have limited application.

One attempt to combat the problems in the art is to build thicker parts. However, the increased thickness adds weight and cost to the component as compared to what could be achieved if thermal and oxidative effects on the component were reduced.

Another attempt utilizes a sacrificial layer on the component to retard material degradation. The sacrificial layer may be a thin carbon veil impregnated with the PMC resin. However, the protection provided by the sacrificial layer is lost over time.

Currently, there are investigations into the use of ceramic fillers carried in polyimide matrices applied as a thermally sprayed coating for OMC components. The coating purports to improve the environmental durability and erosion resistance of the organic matrix composites. However, the thermal spraying process raises environmental, health, safety, energy, and labor issues. Additionally, it is difficult to provide a fully-cured coating system during a thermal spraying deposition process.

Accordingly, it would be desirable to improve the high temperature performance of components comprising organic matrix composites by providing a coating system that improves thermal oxidative stability and mechanical performance.

BRIEF DESCRIPTION OF THE INVENTION

The above-mentioned needs may be met by exemplary embodiments that provide a thermal oxidative barrier coating for organic matrix composite structures. Thus, coated structures formed of high temperature OMC materials could be used, for example, as replacements for metallic components in environments having temperatures greater than the maximum operating temperatures of the unmodified high temperature OMC materials. In other exemplary embodiments, coated structures formed of lower temperature OMC materials could be used in environments having temperatures greater than the maximum operating temperatures of the unmodified lower temperature OMC materials.

In an exemplary embodiment there is provided a method for forming a thermal oxidative barrier coating. The method includes applying a bond coat precursor to at least one surface of an organic matrix composite substrate, curing the bond coat precursor to form a bond coat, applying a thermal barrier precursor substantially overlying the bond coat precursor, and curing the thermal barrier precursor to form a thermal barrier layer, wherein the bond coat and the thermal barrier layer provide a thermal oxidative barrier coating on the at least one surface.

In an exemplary embodiment, the bond coat precursor comprises a curable organic resin and the thermal barrier precursor comprises a curable silsesquioxane or a curable inorganic polymer.

In another embodiment, there is provided a method for providing a coated organic matrix composite structure. The method includes providing a substrate comprising an organic matrix composite comprising a polyimide, wherein the substrate includes at least one surface; and coating the at least one surface with a thermal oxidative barrier coating, wherein the thermal oxidative barrier coating includes a bond coat adjacent the at least one surface and a thermal barrier layer substantially overlying the bond coat. In an exemplary embodiment, the bond coat includes nano-particles dispersed in a polyimide matrix, and the thermal barrier layer comprises at least one member selected from the group consisting of a silsesquioxane and an inorganic polymer.

In an exemplary embodiment, there is provided a method of forming a thermal oxidative barrier coating on an organic matrix composite structure. The method includes forming a bond coat precursor, applying the bond coat precursor in liquid form to a surface of an organic matrix composite structure, curing the bond coat precursor to form the bond coat on the surface, applying a thermal barrier layer precursor substantially overlying the bond coat as a liquid, film, prepreg, molding compound, or spray, and curing the thermal barrier layer precursor to form a thermal barrier layer. The bond coat precursor is formed by dispersing nano-particles such as clay platelets, graphite flakes, and a polyhedral oligomeric silsesquioxane in a curable polyimide resin. The bond coat is operative to reduce oxidative effects to the substrate as compared to a comparable uncoated substrate. The thermal barrier layer is formed of a silsesquioxane or an inorganic polymer. The thermal barrier oxidative coating has a thermal conductivity of not greater than 0.40 W/m·K and is operative to protect the substrate from oxidative and thermal effects in long-term exposure to temperatures of up to about 725° F. (385° C.).

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

FIG. 1 illustrates a portion of a component including a substrate having a thermal oxidative barrier coating thereon.

DETAILED DESCRIPTION OF THE INVENTION

Referring to the drawing, FIG. 1 shows a component 10 for particular use in high temperature environments such as a gas turbine engine, although other applications are contemplated within the scope of the invention. Component 10 includes a substrate 12 and a thermal oxidative barrier coating (TOBC) 14 on at least a first surface 16. First surface 16 is situated on the "hot side" 18 of component 10. The service temperature on the hot side 18 of component 10 may be up to about 725° F. (385° C.).

An exemplary embodiment contemplates the use of a thermal oxidative barrier coating for high temperature OMCs in turbine engine applications. The thermal oxidative barrier coating can be applied to at least the hot side of a composite part to reduce the maximum temperature exposure of the underlying substrate and form a barrier to oxidation of the structural composite resin. An exemplary application of a thermal oxidative barrier coating is for ducts for defining various flow paths in the engine.

Thermal protection systems in the form of thermal barrier coatings (TBCs) have been used with metals for many years. In such cases, low thermal conductivity materials are coated on the surface of the part to create a thermal gradient between the service environment and the part such that the subsurface material is not exposed to a temperature above its maximum use temperature. However, OMCs present features and challenges that are separate and unique from metallic substrates. Thus, the coatings disclosed herein are termed "thermal oxidative barrier coatings (TOBC)" to distinguish them from thermal barrier coatings used for metallic substrates.

In an exemplary embodiment, the OMC matrix material is a high temperature polyimide system However, the disclosed thermal oxidative barrier coatings may be utilized with lower temperature resin systems such as bismaleimide-based polyimide systems (BMI) (e.g., Cycom® 5250-4), which typically offer lower cost and greater ease of processing as compared to the higher temperature polyimide systems. Application of the thermal oxidative barrier coating could allow the use of lower temperature systems in higher temperature environments than previously attainable.

The thermal oxidative barrier coating 14 may include an outer thermal barrier layer 22 and a bond coat 24. In addition to bonding the outer thermal barrier layer 22, the bond coat 24 may additionally function as an oxidation barrier. In an exemplary embodiment, because the bond coat 24 is protected by the thermal barrier layer 22, the polymer matrix of the bond coat 24 may be the same as, or similar to, the polymer matrix of the substrate 12.

In an exemplary embodiment, the materials contemplated for use as the thermal barrier layer 22 are evaluated for thermal conductivity, coefficient of thermal expansion (CTE), thermal stability measured as a function of weight loss, specific gravity, and flexural strength and modulus. In an exemplary embodiment, it is desired to minimize the difference between the CTE of substrate 12 and the CTE of the thermal barrier layer 22. For example, the CTE of the OMC substrate may be in the range of about 1 ppm/° F. (1.8 ppm/° C.), while the CTE of exemplary thermal barrier layers may be in the range of about 3.5 to 6 ppm/° F. (6.3 to 10.8 ppm/° C.). In exemplary embodiments, the desired density of the thermal barrier layer 22 is equal to or less than the density of the OMC substrate 12. However, the maximum allowable density is generally dependent on the thermal conductivity of the material. The thermal conductivity of the thermal barrier layer influences the thickness necessary to realize the required thermal benefit.

In an exemplary embodiment, the coating thickness is sufficient to provide a reduced temperature at the substrate/coating interface 26 of at least 100° F. (56° C.). Thus, in an exemplary embodiment, if the service temperature is approximately 725° F. (385° C.), the temperature exposure at the substrate/coating interface 26 is approximately 625° F. (329° C.), or less. In an exemplary embodiment, the coating 14 comprises a thickness of about 0.030 inches (0.76 mm) to about 0.060 inches (1.5 mm)

An exemplary thermal barrier layer 22 comprises one or more variations of a commercially available system known as Thermablock™ coating. Thermablock coating is a two-part silsesquioxane/titanate material developed as a high temperature coating by MicroPhase Coatings, Inc. Silsesquioxanes are represented by the generic formula $(RSiO_{1.5})_n$ wherein each silicon atom is bound to an average of one and a half (sesqui) oxygen atoms and to one hydrocarbon group (ane). Silsesquioxanes can exist in the form of polycyclic oligomers, ladder, and linear polymers. The Thermablock coating reportedly strongly adheres to various substrates including thermoset OMCs. The two-part coating system cures at 50° F. to 100° F. (10-38° C.). The material is resistant to acids and bases, and has a maximum continuous use temperature of 2000° F. (1093° C.). The CTE of the coating variations range from about 3.5 to 5 ppm/° F. (6.3 to 9 ppm/° C.) and a thermal conductivity of as low as 0.15 W/m·K at 560° F. (293° C.).

In other embodiments, an exemplary thermal barrier layer may comprise a developmental material known as Sialyte™ poly(sialate) material which is currently under development at Cornerstone Research Group, Inc. Poly(sialates) are one general class of inorganic polymers with the base structure of (—Si—O—Al—O—. The actual structure and properties of the poly(sialate) depend on the atomic ratio of Si to Al. The CTE is typically around 5 ppm/° F. (9 pm/° C.) for the neat resin and is tailored by the addition of fillers. A fully cured and dried cast sample is able to withstand 1650° F. (899° C.) before significant loss of strength due to phase transformation. Published data for an unfilled Sialyte poly(sialate) shows a thermal conductivity ranging from 0.2 to 0.4 W/m·K.

In an exemplary embodiment, the bond coat 24 may comprise a polyimide matrix containing nano-particles. Exemplary nano-particles include polyhedral oligomeric silsesquioxane, graphite flake, and clay platelets. The respective amounts of polyimide and nano-particles are determined by factors such as processability, CTE, oxygen barrier capability, and bond strength.

Two exemplary polyimide resins are uncrosslinked MVK-19, a fluorinated high thermal stability resin, and Kapton® polyimide, a high $T_g$ thermoplastic polyimide. A first MVK-19 system includes an exfoliated nano-clay filler. A second MVK-19 system includes exfoliated graphite flake. The polyimide system includes a polyhegral oligomeric silsesquioxane nanofiller. The polyhedral oligomeric silsesquioxane is available from a premixed 15 wt % solution of poly(amic acid) and the polyhedral oligomeric silsesquioxane in N-methylpyrrolidone (NMP) which is commercially available from Hybrid Plastics™. Each of the three systems is optimized as a solution, then tested as a film, and finally tested with a selected thermal barrier layer material.

Processability is measured as a function of the system's viscosity and uniformity of particle distribution. Viscosity verses temperature profiles are evaluated for coating processability. Filler dispersion is measured by various diffractometry and microscopy methods. CTE is measured via dilatometry over the temperature range of −65° F. to 800° F. (−53° C. to 426° C.).

Resistance to oxygen penetration is measured via oxygen diffusivity measurements on films formed from the selected formulation. Coated OMC substrate samples are exposed to thermal oxidative environments for evaluation of thermal protection. For example, a thermal oxidative stability (TOS) test includes placing samples in a chamber through which a constant flow of air travels at a rate sufficient to refresh the chamber volume at a rate of 5 times/hour. The test temperature, pressure, and time is chosen to result in a measurable degradation of unprotected OMC substrate samples. Oxygen barrier capability of the coating is determined by the weight loss of protected OMC substrates relative to unprotected substrates. Although the primary role of the bond coat 24 is to adhere the thermal barrier outer layer 22, oxygen barrier capability is a secondary benefit.

Bond strength is tested at room temperature and at elevated temperature. Due to the similarities in chemistry between the polyimides of the bond coat and the OMC substrate, and the dissimilar chemistry between the polyimides of the bond coat and the thermal barrier layer, initial bond strength evaluation focuses on the adhesion at the bond coat layer/thermal barrier layer interface. Bond strength is measured via flatwise tensile tests.

EXAMPLES

Two candidate materials for the thermal barrier layer 22 are selected to be bonded to two OMC substrates 12 with three candidate bond coat materials 24. The OMC substrates 12 include cured panels of AFR-PE-4 prepreg and BMI (Cycom® 5250-4) prepreg. These twelve combinations are subjected to thermal cycling to evaluate the bond coat/thermal barrier layer interface. Cracking or spalling of the thermal barrier layer is also evaluated during the thermal cycling. The thermal cycling is accomplished by rapidly heating to an isothermal maximum temperature (about 750° F. (398° C.)) and then rapidly cooling to room temperature. Flatwise tensile testing at room temperature of comparable samples as formed, and after thermal testing, is performed to measure the effect on bond strength. The selected bond coats are evaluated for thermal cycling performance, oxygen diffusion to the OMC, and protection of the OMC from thermal oxidative degradation.

Panels of the twelve combinations are evaluated for isothermal oxidative aging effects on select mechanical properties. Mechanical properties of flexural strength and modulus are measured per ASTM C1161.

Thermodynamic calculations, measured material properties, and oxidative aging analysis are used to determine the required thickness of bond coat 24 and the thermal barrier layer 22 so that the coating 14 achieves the desired performance level for specific service conditions.

In exemplary embodiments, a nano-modified bond coat precursor is applied to the selected substrate as a liquid, followed by the application of an inorganic thermal barrier layer precursor as a liquid, molding compound, prepreg, or spray, with the method determined by the specific part to be protected. The prepreg may be supported, for example, with a non-woven veil or woven material such as quartz fabric.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   (a) applying a bond coat precursor to at least one surface of an organic matrix composite substrate, wherein the bond coat precursor comprises a curable organic resin;
   (b) curing the bond coat precursor to form a bond coat on the at least one surface;
   (c) subsequent to (b), applying a thermal barrier precursor substantially overlying the bond coat precursor, wherein the thermal barrier precursor comprises at least one member selected from the group consisting of a curable silsesquioxane and an inorganic polymer; and
   (d) curing the thermal barrier precursor to form a thermal barrier layer wherein the bond coat and the thermal barrier layer provide a thermal oxidative barrier coating on the at least one surface.

2. The method according to claim 1 wherein in (a), applying the bond coat precursor includes:
   applying the bond coat precursor as a liquid.

3. The method according to claim 1 wherein in (c), applying the thermal barrier precursor includes:
   applying the thermal barrier precursor in at least one form selected from the group consisting of a liquid, a film, a prepreg, a molding compound, and a spray.

4. The method according to claim 1 further comprising, prior to (a):
   dispersing nano-particles in the curable organic resin wherein the nano-particles are at least one member selected from the group consisting of clay platelets, graphite flakes, and a polyhedral oligomeric silsesquioxane.

5. The method according to claim 1 wherein the at least one surface is disposed on a hot side of a component adapted for use in a gas turbine engine, wherein the method further comprises:
   (e) subsequent to (d), installing the component in a gas turbine engine wherein the hot side is adapted for exposure to service temperatures up to about 725° F. (385° C.).

6. The method according to claim 1 further comprising:
   providing the substrate, wherein the substrate comprises a high temperature polyimide system.

7. A method comprising:
   (a) providing a substrate comprising an organic matrix composite comprising a polyimide, wherein the substrate includes at least one surface; and
   (b) coating the at least one surface with a thermal oxidative barrier coating, wherein the thermal oxidative barrier coating includes a bond coat adjacent the at least one surface and a thermal barrier layer substantially overlying the bond coat, wherein the bond coat includes nano-particles dispersed in a polyimide matrix, and wherein the thermal barrier layer comprises at least one member selected from the group consisting of a silsesquioxane and an inorganic polymer.

8. The method according to claim 7 wherein in (b), coating the at least one surface includes:
   (i) applying a bond coat precursor in the form of a liquid to the at least one surface; and
   (ii) curing the bond coat precursor to form the bond coat.

9. The method according to claim 8 wherein in (b), coating the at least one surface further includes:
   (iii) applying a thermal barrier precursor substantially overlying the bond coat; and
   (iv) curing the thermal barrier precursor to form the thermal barrier layer.

10. The method according to claim 7 wherein in (b), coating the at least one surface includes:
    (i) applying a bond coat precursor to the at least one surface;
    (ii) substantially overlying the bond coat precursor with a thermal barrier precursor; and
    (iii) co-curing the bond coat precursor and the thermal barrier precursor.

11. A method comprising:
    (a) forming a bond coat precursor by dispersing nano-particles in a curable polyimide resin, wherein the nano-particles comprise at least one member selected from the group consisting of clay platelets, graphite flakes, and a polyhedral oligomeris silsesquioxane;
    (b) applying the bond coat precursor in a liquid form to at least a first surface of an organic matrix composite substrate;

(c) curing the bond coat precursor to form the bond coat on the at least one surface, wherein the bond coat reduces oxidative effects to the substrate as compared to oxidative effects on the organic matrix composite substrate without the bond coat;

(d) applying a thermal barrier layer precursor substantially over the bond coat, wherein the thermal barrier layer precursor is at least one member selected from the group consisting of a silsesquioxane and an inorganic polymer, and wherein the thermal barrier layer precursor is applied as a liquid, film, a prepreg, a molding compound or a spray; and (e) curing the thermal barrier layer precursor to form a thermal barrier layer, wherein the thermal barrier layer and the bond coat provide a thermal oxidative barrier coating having a thermal conductivity of not more than about 0.40 W/m·K, and wherein the thermal oxidative barrier coating is operative to protect the at least one surface from oxidative and thermal effects in service temperatures of up to about 725° F. (385° C.).

12. A method comprising:

(a) applying a bond coat precursor to at least one surface of an organic matrix composite substrate;

(b) applying a thermal barrier precursor substantially overlying the bond coat precursor;

(c) curing the bond coat precursor to form a bond coat, wherein the bond coat is operative to reduce oxidative effects on the substrate due to exposure to elevated temperature, oxygen-containing environments as compared to oxidative effects on the uncoated organic matrix composite substrate; and (d) curing the thermal barrier precursor to form a thermal barrier layer, wherein the bond coat and the thermal barrier layer provide a thermal oxidative barrier coating on the at least one surface.

* * * * *